(12) United States Patent
Hofschulte et al.

(10) Patent No.: US 7,828,662 B2
(45) Date of Patent: Nov. 9, 2010

(54) PLASTIC SLIP CLUTCH

(75) Inventors: Wolfram Hofschulte, Bonndorf (DE); Urban Knöpfle, Titisee-Neustadt (DE)

(73) Assignee: IMS GEAR GmbH, Eisenbach (DE)

( * ) Notice: Subject to any disclaimer, the term of this patent is extended or adjusted under 35 U.S.C. 154(b) by 183 days.

(21) Appl. No.: 11/442,213

(22) Filed: May 30, 2006

(65) Prior Publication Data

US 2006/0270479 A1   Nov. 30, 2006

(30) Foreign Application Priority Data

May 31, 2005   (DE) .................. 10 2005 025 346

(51) Int. Cl.
*F16D 7/10*   (2006.01)
(52) U.S. Cl. .......................... 464/37; 464/30
(58) Field of Classification Search ............ 464/30, 464/37, 41, 34
See application file for complete search history.

(56) References Cited

U.S. PATENT DOCUMENTS

| | | | |
|---|---|---|---|
| 122,818 A * | 1/1872 | Ebbitt | .................. 464/41 |
| 3,406,583 A | 10/1968 | Baier | |
| 3,654,777 A * | 4/1972 | Grundman | .................. 464/30 |
| 4,702,122 A | 10/1987 | Richard | |
| 4,766,641 A | 8/1988 | Daglow | |
| 5,000,721 A * | 3/1991 | Williams | .................. 464/37 |
| 5,242,154 A * | 9/1993 | Schmidt | .................. 464/34 X |
| 5,601,491 A | 2/1997 | Chan et al. | |
| 6,508,140 B2 * | 1/2003 | Zaps | .................. 464/37 X |

FOREIGN PATENT DOCUMENTS

| | | |
|---|---|---|
| DE | 1 150 845 | 6/1963 |
| DE | 72 27 357 U | 11/1972 |
| DE | 198 56 100 A1 | 7/2000 |
| DE | 101 11 644 A1 | 9/2002 |
| EP | 0 702 167 | 8/1999 |
| FR | 2 853 372 | 10/2004 |
| FR | 2 853 373 | 10/2004 |
| GB | 2 022 199 A | 12/1979 |

* cited by examiner

*Primary Examiner*—Greg Binda
(74) *Attorney, Agent, or Firm*—The Nath Law Group; Derek Richmond; Robert T. Burns

(57) ABSTRACT

A plastic slip clutch for an adjustable drive in an automobile includes a hub (3) which exhibits an inner profile (4), and a shaft (1) which exhibits an outer profile (2). For the purpose of transmitting torque, the shaft with the outer profile is introduced into the inner profile of the hub in form-fitting and force-fitting fashion. The inner profile (4) of the hub (3) exhibits plastic elements (5) for the transmission of force, such that the plastic elements (5) become elastically deformed under the effect of a force exceeding a given threshold force and thereby permit the outer profile (2) of the shaft (1) to slip through inside of the hub (3).

1 Claim, 2 Drawing Sheets

PLASTIC SLIP CLUTCH

CROSS-REFERENCE TO RELATED APPLICATIONS

Figure 1:
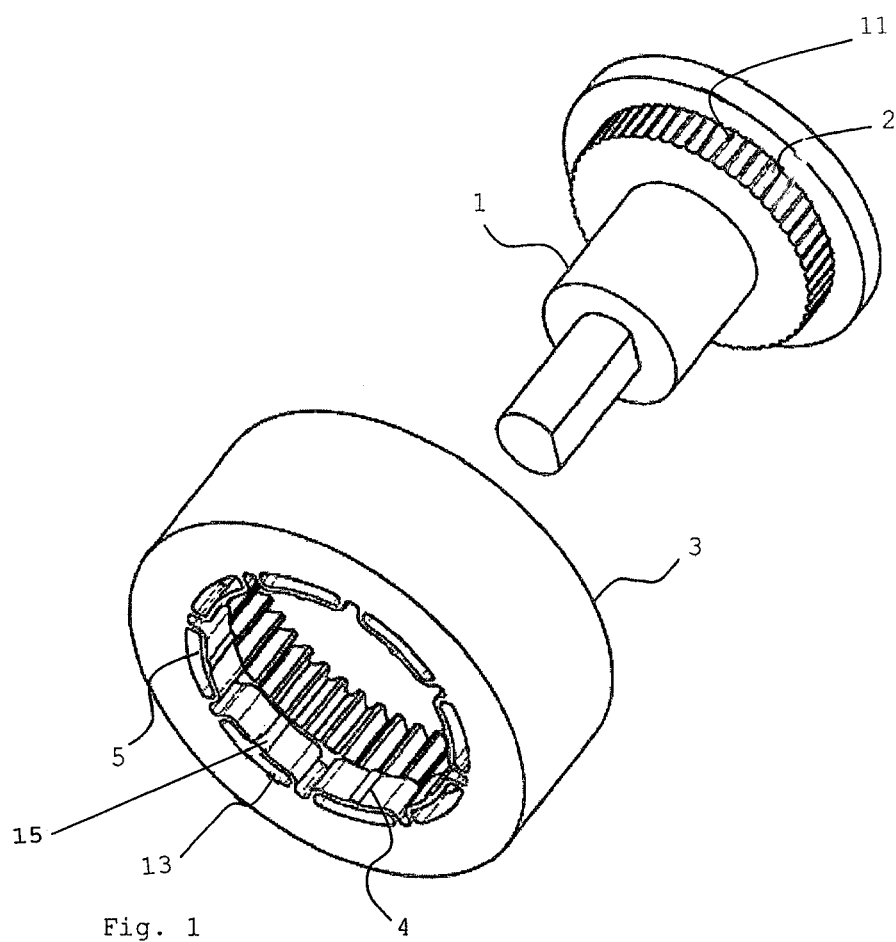

This application claims a benefit of German patent application No. 10 2005 025 346.6, filed May 31, 2005.

BACKGROUND OF THE INVENTION

1. Field of the Invention

The invention relates to a plastic slip clutch for adjustable drives in automobiles.

2. Description of Related Art Including Information Disclosed Under 37 C.F.R. §1.97 and 37 C.F.R. §1.98

Clutches for transmitting torque from a rotating shaft to a drive wheel are known to the prior art. Generally known is a disk clutch with a crown gear, where the disk-shaped coupling elements are pressed together axially by an elastic force. These disk clutches are used in, e.g., parking brakes. A disadvantage here rests in the large number of structural components involved, particularly spring washers and washer disks, as well as the coarse mechanical resolution and step width. Also disadvantageous is the elaborate process of mounting the individual components, either manually or in automated fashion, when the disk clutch is assembled, or upon installation of the slip clutch in a gear.

BRIEF SUMMARY OF THE INVENTION

The goal of the invention is to propose an alternative clutch for transmitting the torque of a rotating shaft. The solution to this problem can be advantageously applied to translatory clutches.

The problem is solved by a plastic slip clutch, and specifically by a hub as recited in the claims.

Accordingly preferred is a plastic slip clutch for an adjustable drive in an automobile, with a hub which exhibits an inner profile, and with a shaft which exhibits an outer profile, such that for the purpose of torque transmission the shaft with the outer profile is introduced into the inner profile of the hub in form-fitting and force-fitting fashion, and such that the inner profile of the hub exhibits plastic elements for the transmission of force, such that the plastic elements become elastically deformed under the effect of a force exceeding a given threshold force. The plastic slip clutch is particularly suited for automotive adjustable drives with a locking function or with a defined pitch and defined overload torque.

Advantageous embodiments are the subject matter of dependent claims.

Particularly preferred is a hub with an inner profile which exhibits plastic elements that are elastically deformed under the influence of a force that is greater than a threshold force, where the hub is designed for installation in such a slip clutch.

Particularly preferred is a plastic slip clutch such that the elastic deformation of the plastic elements results in an expansion of the hub, or of the hub's inner profile, and thereby allows the outer profile of the shaft to slip through.

Particularly preferred is a plastic slip clutch where the plastic elements are designed as bridges.

Particularly preferred is a plastic slip clutch in which the inner profile of the hub radially supports the outer profile of the shaft with the plastic elements designed as bridges.

Particularly preferred is a plastic slip clutch in which the elastic deformation completely recedes when a value is reached below the threshold force or below a smaller threshold value.

Particularly preferred is a plastic slip clutch in which the plastic elements engage with opposing elements of corresponding design in the outer profile of the shaft, in order to transmit torque.

Particularly preferred is a plastic slip clutch in which the plastic elements designed as bridges form defined locking positions for the opposing elements.

Particularly preferred is a plastic slip clutch, particularly a hub, manufactured in a design that permits the elimination of tools.

This kind of plastic slip clutch, and particularly this kind of hub, permits the form-fitting transmission of torque while providing a slip-through function in the case of overload, and thereby protects actuated drive components against damage. It is advantageous that the locking positions have a defined resolution. As compared to known solutions, there is the distinct advantage conferred by fewer components and by the capability of producing plastic parts in a compact design and with a reduced tool requirement. A mechanical resolution with finer steps than in known clutches is possible.

Advantageously eliminated are elastic washers and washer disks, as well as elastic elements for bracing spring washers and washer disks in the axial direction, as required in clutches known to the prior art. Furthermore, finer locking resolutions than in known clutches can be realized within the same space and given the same torque requirement.

Applications particularly suggest themselves for all self-locking drives which are designed to permit manual adjustment in addition to electrical operation. In particular, it is possible to protect the drive components against misuse. Moreover, applications can be employed to special advantage in gears that are not jam-proof, e.g., highly-geared planetary gears, in order to protect the gear components against damage when the drive shaft is jammed.

In an alterative and preferred realization there is a plastic slip clutch for an automotive adjustable drive with two clutch elements that engage with each other and have a linear design, such that at least one of these clutch elements exhibits a profile with plastic elements which engage in form-fitting and force-fitting fashion with an opposing profile belonging to the other clutch element in order to transmit linear drive forces, and such that one of the profiles exhibits plastic elements for the transmission of force, such that the plastic elements become elastically deformed when a force is reached that exceeds a specific threshold force.

In this plastic slip clutch it is advantageous that the elastic deformation of the plastic elements allows the given profile to flatten out and the opposing profile to slip through.

It is advantageous in this plastic slip clutch that the distance between the two coupling elements is so determined that when the plastic elements give way the corresponding profile flattens out and, at the same time, the closer convergence of the two coupling elements, which could impede or prevent the slip-through process, is avoided.

The plastic elements are advantageously designed as bridges. It is advantageous that the elastic deformation recedes completely when the value drops below the threshold force or below a smaller threshold force. The plastic elements will preferably engage with opposing elements of a corresponding design in order to transmit force. The plastic elements create advantageously defined locking positions for the opposing elements. The plastic slip clutch can be manufactured in a design that permits the elimination of tools.

BRIEF DESCRIPTION OF THE SEVERAL
VIEWS OF THE DRAWINGS

Figure 2:
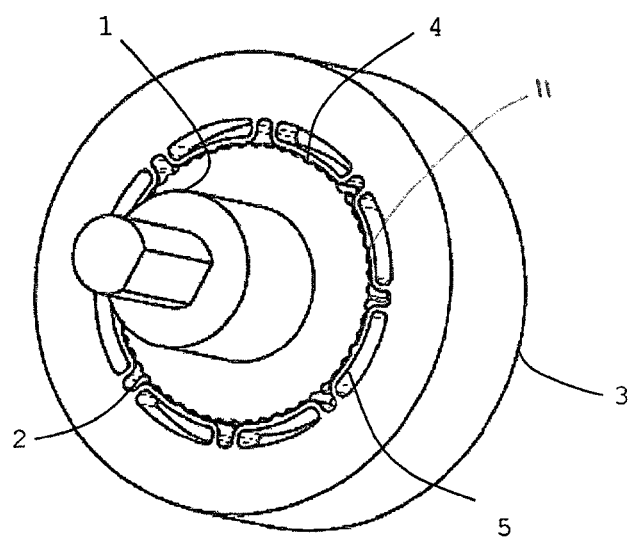
Figure 3:
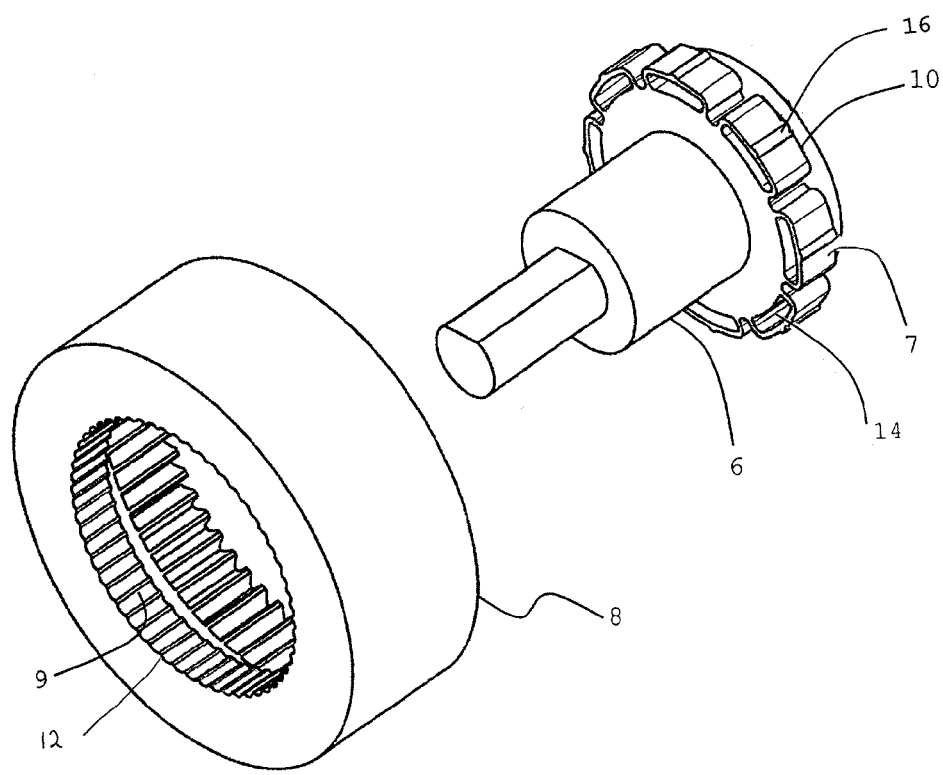
Figure 4:
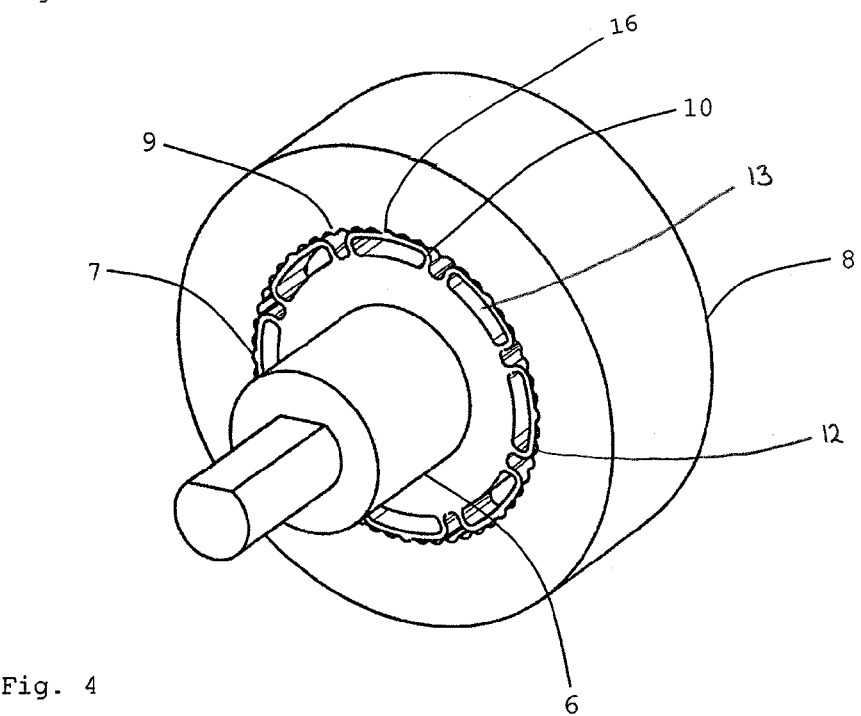

An exemplary embodiment is next described on the basis of the drawing. Shown in the drawing are:

FIG. 1 showing a first embodiment of a shaft and hub of a plastic slip clutch in a disassembled view;

FIG. 2 showing the first embodiment of the shaft and hub in assembled condition;

FIG. 3 showing a second embodiment of a shaft and hub of a plastic slip clutch in a disassembled view; and FIG. 4 showing the second embodiment of the shaft and hub in assembled condition.

DETAILED DESCRIPTION OF THE INVENTION

As can be seen in FIGS. 1 and 2, the clutch, which is designed as a plastic slip clutch, consists of a shaft 1 and a hub 3, which can be inserted one into the other in order to transmit torque, or, as the case may be, to transmit a force that sets the shaft into rotation. The shaft 1 has an outer profile 2, which engages in form-fitting and force-fitting fashion inside an inner profile 4 belonging to the hub 3 for the purpose of torque transmission. Form-fitting is understood to mean an engagement such that, upon rotation of the shaft 1 or the hub 3, the transmission of force is permitted from one of these elements to the other.

The inner profile 4 of the hub 3 exhibits elastically deformable plastic elements 5, specifically elastically deformable plastic bridges, which engage with corresponding, but opposing elements 11 belonging to the outer profile 2 of the shaft 1. The hub and its inner profile, which will advantageously be designed as a single piece, thus exhibit plastic elements 5 in the form of elastically deformable plastic bridges to radially support the outer profile 2 of the shaft 1. Particularly advantageous are the plastic bridges, which extend in axially parallel fashion. In the case of overload, e.g., due to blockage or misuse, the elastic deformation of the plastic elements 5 will cause the hub to expand when a force in excess of a threshold force is reached, and will thus allow the clutch or, as the case may be, the outer profile 2 of the shaft 1 to slip through.

As can be seen from FIGS. 3 and 4, an alternative embodiment of the plastic slip clutch consists of a shaft 6 and a hub 8, which engage with each other to transmit torque or, as the case may be, force that sets the shaft in rotation. The shaft 6 exhibits an outer profile 7, which engages inside an inner profile 9 of the hub 8 in form-fitting and force-fitting fashion for the purpose of torque transmission.

In this embodiment the outer profile 7 of the shaft 6 exhibits elastically deformable plastic elements 10, specifically elastically deformable plastic bridges, which engage with corresponding, but opposing elements 12 of the inner profile 9 of the hub 8. The shaft 6 and outer profile 7, which will advantageously be designed as a single piece, thus exhibits plastic elements 10 in the form of elastically deformable plastic bridges, which radially support the inner profile 9 of the hub 8. Particularly advantageous are the plastic bridges 10, which extend in axially parallel fashion. In the case of overload the elastic deformation of the plastic elements 10 will cause the circumference of the shaft 6 to narrow when a force in excess of a threshold force is reached, and will thus allow the clutch or, as the case may be, the inner profile 9 of the hub 8 to slip through.

In the embodiments shown in FIGS. 1-4, at least one of these clutch elements exhibits a profile with n plastic elements 5,10 which engage in form-fitting and force-fitting fashion with an opposing profile with m opposing elements 11,12 belonging to the other clutch element in order to transmit linear drive forces. The n plastic elements transmit force, such that the n plastic elements become elastically deformed under the effect of a force that exceeds a specific threshold force. Each of the n plastic 5,10 elements acts as a bridge, which extends in axially parallel fashion on its outer surface facing the opposing profile. Each bridge has a ridge 13,14 and a single hole 15,16 defined by the bridge and the clutch element to which the bridge belongs. In this exemplary embodiment, the n plastic elements 5,10 engage with the m opposing elements 11,12 for the transmission of force, wherein the elastic deformation of the n plastic elements 5,10 allows the corresponding profile to be deformed and the opposing profile to slip through. In the embodiments shown, m (the number of the opposing elements 11,12) is greater than n (the number of the plastic elements 5,10).

In another embodiment that is not depicted the operating principle of the invention is applied to translatory motion and plastic slip clutches. Here two linear, interlocking clutch elements lie opposite each other. At least one of these clutch elements (3; 6) has a plastic element (5; 10) formed with a profile (4; 7) with plastic bridges of the above-described type, which engage with an opposing profile (2; 9) in the other clutch element (1; 8). In this embodiment the plastic bridges also have an elastic design such that they yield when there is an overload and permit the slip-through process. Here an advantageous feature rests in the fact that the separating distance between the two clutch elements (1, 3; 6, 8) is fixed, so that when the plastic elements (5; 10) yield, the corresponding profile flattens out and a closer convergence of the two clutches elements, such as would prevent a slip-through, is avoided.

The invention claimed is:

1. A plastic slip clutch for adjustable drives in automobiles, with
    two clutch elements that engage with each other and have a linear design,
    where at least one of these clutch elements exhibits a profile with n plastic elements which engage in form-fitting and force-fitting fashion with an opposing profile with m opposing elements belonging to the other clutch element in order to transmit linear drive forces, and
    where one of the profiles exhibits the n plastic elements for the transmission of force, such that the n plastic elements become elastically deformed under the effect of a force that exceeds a specific threshold force,
    wherein each of the n plastic elements has a bridge, which extends in axially parallel fashion on its outer surface facing the opposing profile, the bridge having a ridge and only a single hole defined by the bridge and the clutch element to which the bridge belongs,
    wherein the n plastic elements engage with the m opposing elements for the transmission of force,
    wherein the elastic deformation of the n plastic elements allows the corresponding profile to be deformed and the opposing profile to slip through, and
    wherein n is the number of the plastic elements and m is the number of the opposing elements, with m being greater than n.

* * * * *